United States Patent [19]

Jensen et al.

[11] Patent Number: 4,914,580
[45] Date of Patent: Apr. 3, 1990

[54] COMMUNICATION SYSTEM HAVING INTERRUPTS WITH DYNAMICALLY ADJUSTED PRIORITY LEVELS

[75] Inventors: Craig W. Jensen, Aberdeen; Frederick R. Keller, Jackson, both of N.J.

[73] Assignee: American Telephone and Telegraph Company, New York, N.Y.

[21] Appl. No.: 112,581

[22] Filed: Oct. 26, 1987

[51] Int. Cl.⁴ ............................................. G06F 13/00
[52] U.S. Cl. ................................. 364/200; 364/241.3; 364/241.4; 364/241.5
[58] Field of Search ... 364/200 MS File, 900 MS File; 340/825.5

[56] References Cited

U.S. PATENT DOCUMENTS

| | | | |
|---|---|---|---|
| 3,676,860 | 7/1972 | Collier et al. | 364/200 |
| 3,815,105 | 6/1974 | Adkins et al. | 364/200 |
| 3,905,025 | 9/1975 | Davis et al. | 340/172.5 |
| 3,925,766 | 12/1975 | Bardotti et al. | 364/200 |
| 4,148,011 | 4/1979 | McLagen et al. | 364/900 |
| 4,268,904 | 5/1981 | Suzuki et al. | 364/200 |
| 4,296,463 | 10/1981 | Dalboussiere et al. | 364/200 |
| 4,302,808 | 11/1981 | Zanchi et al. | 364/200 |
| 4,320,502 | 3/1982 | DeVeer | 364/900 |
| 4,373,181 | 2/1983 | Chisholm et al. | 364/200 |
| 4,438,489 | 3/1984 | Heinrich et al. | 364/200 |
| 4,493,036 | 1/1985 | Boudreau et al. | 364/200 |
| 4,495,569 | 1/1985 | Kagawa | 364/200 |
| 4,654,820 | 3/1987 | Brahm | 364/900 |

OTHER PUBLICATIONS

Beukema et al, "Asynchrouous Command Prioritization", IBM Technical Disclosure Bulletin, vol. 23, No. 4, Sep. 1980, pp. 1610–1614.
Birch et al, "Priority Determination and Servicing I/O Devices", IBM Tech. Discl. Bull., vol. 16, No. 3, Aug. 1973, pp. 874–875.
Edel, "CPU and Interrupt Priority Merge", IBM Tech. Discl. Bull, vol. 15, No. 10, Mar. 1973, pp. 3104–3105.

Primary Examiner—Gareth D. Shaw
Assistant Examiner—Jonathan C. Fairbanks
Attorney, Agent, or Firm—John A. Caccuro

[57] ABSTRACT

A communication system includes a processor, memory circuits and a plurality of interfaces for interfacing to data devices. The processor services the interfaces using an interrupt bus including unidirectional inbound and outbound buses. The inbound bus includes one lead for each interface, with each lead having a fixed priority level assigned by the processor. Each interface has access to all leads of the inbound bus. The processor sends commands over the outbound bus to dynamically control the connection of an interface to a lead of the inbound bus.

10 Claims, 3 Drawing Sheets

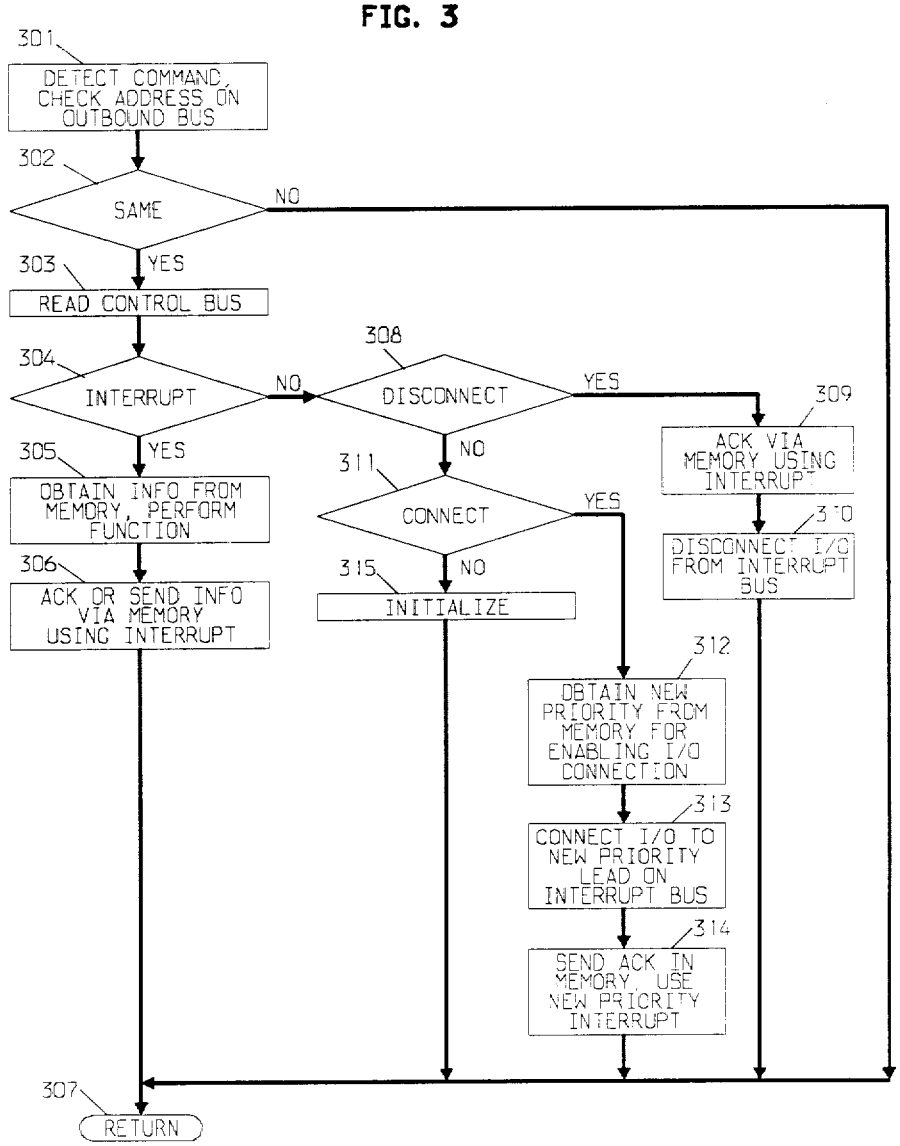

000
COMMUNICATION SYSTEM HAVING INTERRUPTS WITH DYNAMICALLY ADJUSTED PRIORITY LEVELS

TECHNICAL FIELD

This invention relates to a communication system which dynamically adjusts the communication priorities of I/O devices connected thereto.

BACKGROUND OF THE INVENTION

A processor controlled communication system typically includes at least one processor (CPU), one or more memory components and one or more input/output (I/O) interfaces. Each memory component provides program and data storage while each I/O interface connects the communication system to any of a variety of data devices.

Because the processor can only communicate with one I/O interface at a time, each I/O interface is assigned a priority level to resolve simultaneous service requests from different I/O interfaces of the system. In the prior art, priority was often assigned in accordance with the slot in the system into which the I/O interface was connected. Undesirably, the priority assignment was fixed by the physical location of the I/O interface. To provide an adjustable priority assignment, some systems included straps on the backplane or switches on each I/O interface card. During the operation of the system, it is often necessary to dynamically change the priority of one or more I/O interfaces in response to internal or external stimuli. In addition, straps and switches also complicate the installation and maintenance of the system. The problem then is to provide a system with a capability to dynamically adjust the priorities of I/O interfaces.

SUMMARY OF THE INVENTION

In accordance with the present invention, a processor and plurality of I/O interfaces of a system are connected by an interrupt bus including unidirectional inbound and outbound buses. The processor dynamically sends commands over the outbound bus controlling the connection of an I/O interface to the inbound bus. The inbound bus includes one lead for each of said plurality of I/O interfaces, each lead having a fixed priority level assigned by the processor. The processor dynamically changes the priority of a selected interface by sending a command over an outbound interrupt bus using the address of the selected I/O interface. In response to the received command, the selected I/O interface changes its connection to a lead of the inbound interrupt bus specified in the command.

BRIEF DESCRIPTION OF THE DRAWING

In the drawings,

FIG. 3 is a flow chart describing the operation at an I/O interface of the system;

FIG. 4 shows a table illustrating the control bit assignment for the system; and FIG. 5 illustrates a table showing the relative priorities of I/O interfaces.

DETAILED DESCRIPTION

Figure 1:
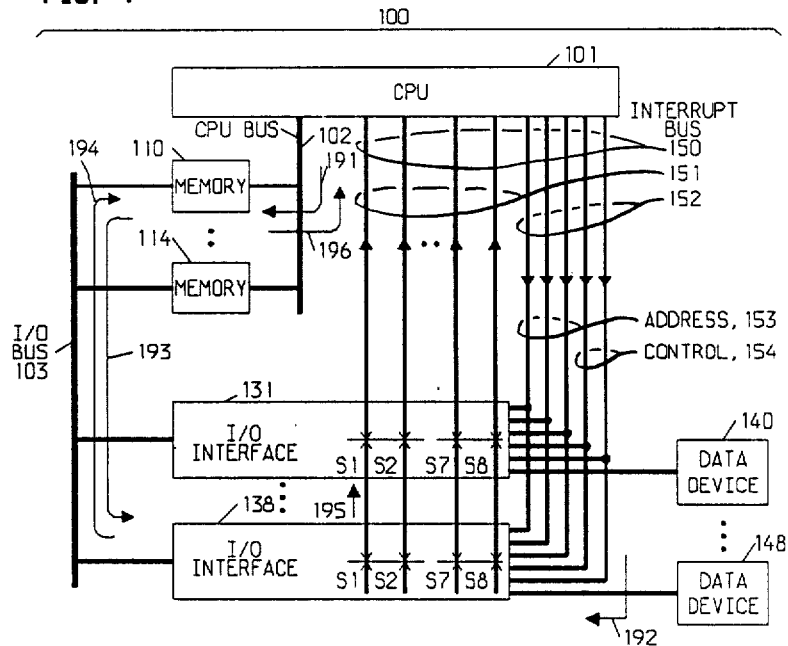
FIG. 1 shows a block diagram of a communication system useful in describing the present invention.

Referring to FIG. 1, there is shown a data processing system 100 useful in describing the present invention. The system includes a central processor unit CPU 101, memory circuits 110 through 114 and input-output I/O interfaces 131 through 138. These circuits are arranged on circuit packs which mount into slots of a carrier unit. The memory components 110-114 provide system program and data storage. The I/O interfaces 131-138 interface the system to a variety of peripheral data handling devices (140). Illustratively, I/O interfaces 131-138 may include disc and tape drive interfaces, packet processor interfaces for CPU-to-CPU intersystem communication, local area network interfaces, time division interfaces for sync devices, encryptor interfaces, packet interfaces for async devices, and standard interfaces (e.g., RS232). The present invention can be utilized with any number and type of I/O interfaces.

The processor CPU is connected to memories 110-114 by the CPU bus 102. The I/O interfaces 131-138 are connected to memories 110-114 by the I/O bus 103. The processor CPU 101 is connected to I/O interfaces 131-138 by the interrupt bus 150. The interrupt bus 150 is comprised of two unidirectional signaling busses 151 and 152 and is not designed for data transfer between processor CPU 101 and I/O interfaces 131-138.

Unidirectional bus 151 is utilized for signaling inbound CPU interrupts and includes one lead for each of the plurality of I/O interfaces 131-138. The term "inbound interrupt" refers to a signal that is generated by one of the I/O interfaces and is targeted for CPU 101. Since inbound interrupt bus 151 provides eight non-encoded interrupt leads, it is possible for any combination of I/O interfaces to generate interrupts to CPU 101 at the same time.

The eight inbound interrupt leads of bus 151 are assigned a fixed relative priority on CPU 101. Each I/O interface 131-138 can connect, via switches S1-S8, to any of the eight leads of bus 151. However, it is not desirable to statically assign a fixed priority to each I/O interface on the basis, for example, of the slot number that the interface occupies in the equipment. This is because that would have the effect of statically assigning a fixed priority to the I/O interfaces regardless of the type of data device (e.g., 140) that it connects to or to other system level considerations.

The present invention enables the dynamic adjustment of interrupt priorities to each I/O interface using standard circuitry (illustratively, switches S1-S8) for switchably connecting to any of the eight inbound interrupt leads of bus 151. At initialization time, CPU 101 sends a command to each I/O interface, telling it which of the eight lines to use. Alternatively, at initialization each I/O interface may use a priority level associated with its slot number or address. The assignment of interrupt priority level for I/O interfaces may be changed dynamically as often as necessary, consistent with other operations being performed by system 100. This feature may be used, for example, for optimizing system performance under various conditions.

Unidirectional bus 152 is utilized for signaling outbound interrupts to the I/O interfaces and includes three address leads 153 needed to access the eight I/O interfaces and two control leads 154 for signaling the type of command interrupts.

The above-described CPU 101, memory circuits 110-114, I/O interfaces 131-138, CPU bus 102, I/O bus 103, and interrupt bus 150 can be implemented using any of a variety of well-known circuits and equipment, the particular operation of which will be described only when relevant to the understanding of the present invention.

In normal operation, the processor CPU 101 stores an I/O command, 191, in memory 110 and then generates an interrupt, 192, to an I/O interface, 138, to which the command is intended. On receiving the interrupt, I/O interface 138 fetches, 193, the command from memory 110 and executes it. Thereafter, I/O interface 138 stores a response, 194, in memory 110 and generates an interrupt, 195, over one lead of bus 151 for processor CPU 101. Processor CPU 101 receives the interrupt and then fetches the response, 196, from memory 110.

It should be noted that when system 100 is first assembled, processor CPU 101 does not know how many memory circuits 110-114 or I/O interfaces 131-138 are present in the system. Obviously, when more than one memory exists, the CPU 101 and I/O interfaces 131-138 have to choose the same memory through which to communicate. However, when only one memory exists, its location or address is initially unknown to CPU 101 or the I/O interfaces. The process of locating and selecting a memory over which to communicate is described in our copending application, Ser. No. 763,636 filed on Aug. 8, 1985, now U.S. Pat. No. 4,821,179, which description is incorporated here by reference. For the description of the present invention, memory 110 is assumed to be the memory used for data communications between CPU 101 and I/O interfaces 131-138.

As previously noted, the number of I/O interfaces in the system can also be one or more. In one embodiment, system 100 utilizes universal circuit pack slots. In such an arrangement, the configuration, i.e., the ordering or physical location of the memory and I/O interfaces within the slots of the equipment, is not known and may change when changes are made to the operating size or feature capability of the system. The present invention enables CPU 101 to change the priority assignment of the I/O interfaces.

The operation of the disclosed interrupt bus 150 structure satisfies the above normal system operation. In addition, bus 150 permits any number of I/O interfaces to send interrupts concurrently to the CPU 101. Since each I/O interface has an assigned priority, CPU 101 handles the interrupts in order of priority. Moreover, as will be discussed, CPU 101 can dynamically change the relative priority of interrupts from I/O interfaces. Finally, CPU 101 uses operation code (opcode) commands to direct I/O interfaces to initialize, to disconnect from the I/O bus 103, to reconnect to a particular lead of the I/O bus 103, and to perform normal interrupt operation. The table in FIG. 4 illustrates the respective opcode command which I/O interfaces 131-138 received in parallel on the control leads 154 of outbound bus 152. The address leads 153 are used to select which I/O interface should receive the opcode.

Since each I/O interface can sense its own address from the slot it is installed in, it determines when it is the target of an interrupt by monitoring the address on the address leads 153. The address of an I/O interface may, for example, be the backplane slot in which the I/O interface is installed. In another embodiment (not shown), outbound bus 152 is a single lead with address and opcode information multiplexed thereon.

Before proceeding with the operating description of the present invention, it should be recognized that the present invention may be utilized in a variety of telephone communication systems. Since such systems utilize a variety of hardware and programming techniques, no attempt is made to describe the program used to control the communication system. However, the present invention must be blended into the overall software and hardware structure of the system in which it is used and must be tailored to mesh with other features and operations of the system. Thus, in order to avoid confusion and in order to enable those skilled in the art to practice the claimed invention, this specification will describe the operation of the present invention using the block diagram of FIG. 1, the flow charts of FIGS. 2 and 3 and the tables of FIGS. 4 and 5, which together describe the logical steps and the various parameters required to implement the present invention.

In the following description, each item of each figure has a reference designation associated therewith, the first number of which refers to the figure in which that item is first located (e.g., 110 is located in FIG. 1).

Figure 2:
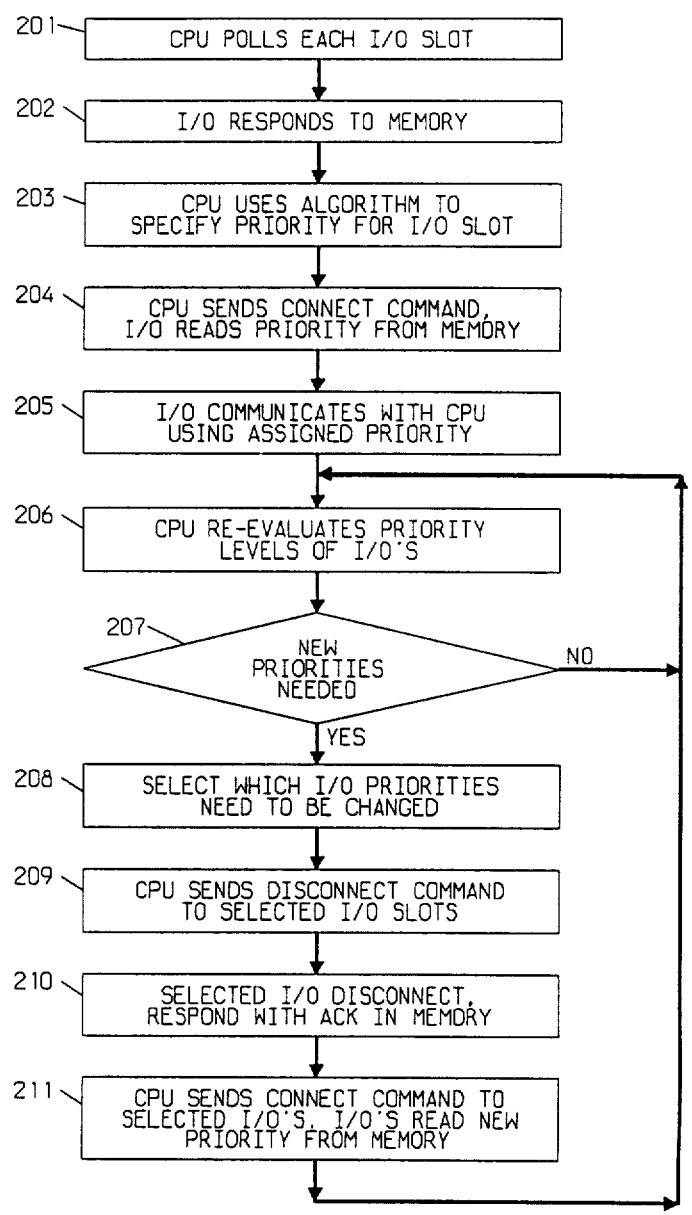
FIG. 2 is a fow chart describing the operation of the system of FIG. 1.

FIG. 2 illustrates a flow chart describing the operating sequence of some aspects of the present invention. In step 201, CPU 101 initializes the system by polling each I/O slot to determine which I/O interfaces 131-138 are present. This polling is accomplished using an outbound interrupt having an initialization opcode or command as shown in 402 of FIG. 4. In step 202, each present and operating I/O interface responds to a predetermined location in memory 110. If an I/O interface is not operating or is not present in a slot, no response is received within a predetermined time and CPU 101 stores the result in the occupied column 502 of I/O table 500 shown in FIG. 5. Illustratively, column 502 of table 500 shows that all I/O slots, 501, other than slot 2 have an I/O interface present and operating therein. Note the I/O interface response may also include data, 503, describing the type of interface present (e.g., disc). Such information may be used, for example, in the algorithm used by CPU 101 to determine I/O interface priorities.

In step 203, CPU 101 uses a preprogrammed algorithm to determine the relative priority from the type of I/O interfaces present. The priority level information is stored, illustratively, in column 504 of table 500. As shown in table 500, the priority levels for I/O interfaces in slots 501 can be set to any relative priority level as shown in column 504. It should be understood that the algorithm for selecting relative priority level among the present I/O interfaces 131-138 can be made to change in response to internal or external indicia. For example, CPU 101 may determine that a priority of an I/O interface should change depending on the time of day or other criteria.

Once CPU 101 has determined the relative priorities, it sends, in step 204, connect messages to each I/O interface. This is accomplished for each I/O interface by sending an I/O address and opcode (shown in 403 of FIG. 4) over address leads 153 and control leads 154, respectively. Additionally, CPU 101 may send data for that I/O interface via the communication area of memory 110. This data may include the priority assignment for that I/O interface. After the priority levels are established and communicated to all I/O interfaces 131-138, communication between CPU 101 and each I/O interface ensues in step 205.

The sequences of operation for communication between CPU 101 and the I/O interfaces 131-138 proceeds as previously described and illustrated by operations 191-196. Obviously, the sequence of operations 194-196 precede operations 191-193 when an I/O interface initiates the communication to CPU 101. As noted, when concurrent interrupts are received over inbound interrupt bus 151, CPU 101 handles them in order of priority.

In step 206 in response to an internal or external criteria, CPU 101 re-evaluates the assigned priority levels of one or more of the plurality of I/O interfaces. In step 207, if CPU 101 determines that no change is necessary, I/O interface communications continue using the present priority levels. If new priorities are needed, CPU 101 in step 208 selects which I/O interfaces should have their priority changed and specifies what the new priority levels should be. In step 209, CPU 101 sends (i.e., signals) a disconnect command (404 of FIG. 4) to the affected I/O interface. In response, in step 210, the selected I/O interface disconnects from its existing connection to a lead of bus 151 and acknowledges same in a response sent to memory 110. This process is repeated for each I/O interface affected by the change of priority operation. Thereafter, in step 211, CPU 101 sends connect commands to the selected I/O interfaces and sends the priority assignment and other data via memory 110. CPU 101 also updates entries in the table 500. Each of the addressed I/O interfaces receives the connect command, reads data from memory 110, connects to the new lead of bus 151 to establish the new priority level, and acknowledges same in memory 110. After the I/O interfaces have completed the change of priority operation, communication between CPU 101 and the I/O interfaces then proceeds in step 205, using the newly assigned priorities. CPU 101 continues to dynamically re-evaluate priority levels in steps 206 and 207 in accordance with its own pre-established criteria and makes changes in the manner described when appropriate.

With reference to FIG. 3, the detailed operation of an I/O interface is described. Depending on the level of sophistication of the functions performed, an I/O interface may be implemented using well-known discrete, integrated or microprocessor circuits. Each I/O interface (e.g., 138) provides the function of enabling communication between a particular type of I/O data device (e.g., 148) and CPU 101. Each I/O interface also detects commands addressed to it on outbound bus 152. Each I/O interface detects its address on address bus 153, decodes interrupt code on control bus 154, and makes any changes in the connection to any lead of inbound bus 151 in response to commands (address and opcode) received on outbound bus 152. FIG. 3 describes in flow chart form the functions required for I/O interface operation in accordance with the present invention.

In step 301, the I/O interface detects a command on outbound bus 152 and checks the address on address bus 153. The address on address bus 153 is checked or detected by comparing it with the address of the I/O interface. As noted, the I/O interface address may be its slot number. If the address is not the same, in step 302 the I/O interface ignores the command and returns to a standby mode 307. If the address is the same, the bits on control bus 154 are decoded to determine which of the functions 401-404 is to be performed by that I/O interface.

When the command opcode defines an interrupt function 401, in step 305 the I/O interface reads the communication area of memory 110 to obtain further commands or data describing a particular function requested by CPU 101. This interrupt function or operation describes the normal method of communication between CPU 101 and the I/O interface. Thereafter, in step 306 the I/O interface acknowledges the reception, responds with data, or makes a request of CPU 101 via memory 110 and then signals CPU 101 using the previously described inbound interrupt (195 of FIG. 1). I/O interface then returns to standby mode 307.

If a disconnect command opcode 404 is detected, 308, circuitry in I/O interface reads memory 110 to obtain other information required to carry out the change required. Then the I/O interface acknowledges the receipt of the command, 309, and then disconnects, 310, the I/O interface from the previously assigned lead of inbound interrupt bus 151. The I/O interface then returns to standby mode 307.

When a connect command opcode 403 is detected, step 311, I/O interface reads memory 110, step 312, to obtain the new priority assignment and any other needed information to complete a change of priority operation. In response to the connect command, a connection is made, in step 313, to the lead of inbound bus 151 to establish the newly assigned priority level for that I/O interface. I/O interface, in step 314, uses the newly assigned priority level to acknowledge the receipt of the command and may also send a response back to CPU 101.

When the command opcode describes an initialize function 402, step 315, then as previously described in FIG. 2 the I/O interfaces are polled and CPU 101 determines the priorities for I/O interfaces presently connected to the system. As part of the initialization process, each I/O interface connects to a preassigned lead of the inbound bus 151.

What has been described is merely illustrative of the application of the principles of the present invention. Other methods and circuits can be implemented by those skilled in the art without departing from the spirit and scope of the present invention.

What is claimed is:

1. A communication system including a processor connected over an interrupt bus to a plurality of interfaces, wherein said bus comprises a processor outbound bus for signaling a command from said processor to an addressed interface;

a processor inbound bus having a plurality of leads including one lead for each interface of said plurality of interfaces, each lead assigned a fixed priority level by said processor for signaling an interrupt from an interface to said processor;

said processor comprising means for sending over said outbound bus a command to each interface specifying a connection between each interface and a different lead of said inbound bus; and each interface comprising switching means for connecting to anyone of said plurality of leads of said inbound bus, means for detecting on said outbound bus a received command addressed to said each interface, and means responsive to said received command for enabling said switching means to establish a connection to a lead of said inbound bus as specified in said received command.

2. The communication system of claim 1 further including a readable and writable memory connected over a third bus to said processor and connected over a fourth bus to said plurality of interfaces, said processor and said plurality of interfaces communicating data therebetween using said third bus said memory and said fourth bus and said command is used to signal each interface to read said memory to obtain data specifying the lead of said inbound bus to which each interface should connect.

3. The communication system of claim 1 wherein said processor sending means sends an initialization command specifying an initialization procedure to be performed at each interface including a predetermined connection assignment to a lead of said inbound bus, and each interface includes means responsive to said received initialization command for performing said initialization procedure.

4. The communication system of claim 1 wherein said outbound bus includes an address bus over which the processor sends an address for selecting an interface to receive a command and a control bus over which the processor sends a command to the selected interface.

5. The communication system of claim 1 wherein said processor sending means sends a disconnect command to a selected interface specifying that said selected interface disconnect from the inbound bus.

6. The communication system of claim 1 wherein said command is a connect command which specifies that a selected interface connect to a certain lead of said inbound bus.

7. An interface for enabling communication between a data device and a processor of a communication system, said interface connected to said processor using a data bus and an interrupt bus, said interface arranged to receive commands for said processor and said data bus, and said interface comprising switching means for connecting to each lead of a multilead inbound bus of said interrupt bus wherein each lead of said inbound bus signals a different priority interrupt level from said interface to said processor, means for detecting on an outbound bus of said interrupt bus a received command from said processor addressed to said interface, and means responsive to said received command for enabling said switchably connecting means to connect to a lead of said multilead inbound bus as specified by said received command, said lead establishing an interrupt priority level for data communications between said interface and said processor.

8. The interface of claim 7 wherein said command signals said interface to obtain data via said data bus for specifying the connection to said inbound bus.

9. The interface of claim 7 wherein said detecting means receives an address over an address bus of said outbound bus for selecting said interface and receives a command over a control bus of said outbound bus for specifying an operation to be performed at said interface.

10. A method of operating a communication system including a processor connected over an interrupt bus to a plurality of interfaces, the method comprising the steps of:

at said processor specifying an interrupt priority level of each interface of said plurality of interfaces by sending over an outbound bus of said interrupt bus a command to each interface specifying a connection between each interface and a different lead of a multilead inbound bus of said interrupt bus, each lead having a priority level assigned by said processor for data communications between each interface and said processor; and receiving from each interface an interrupt over said different lead of said inbound bus; and at each interface detecting on said outbound bus a command addressed to it, and switchably connecting to said different lead of said inbound bus as specified in said command.

* * * * *